July 21, 1959  J. E. BECKETT  2,895,259
ORCHARD FAN DRIVEN BY RAM-JET ENGINES
Filed July 2, 1956  3 Sheets-Sheet 1
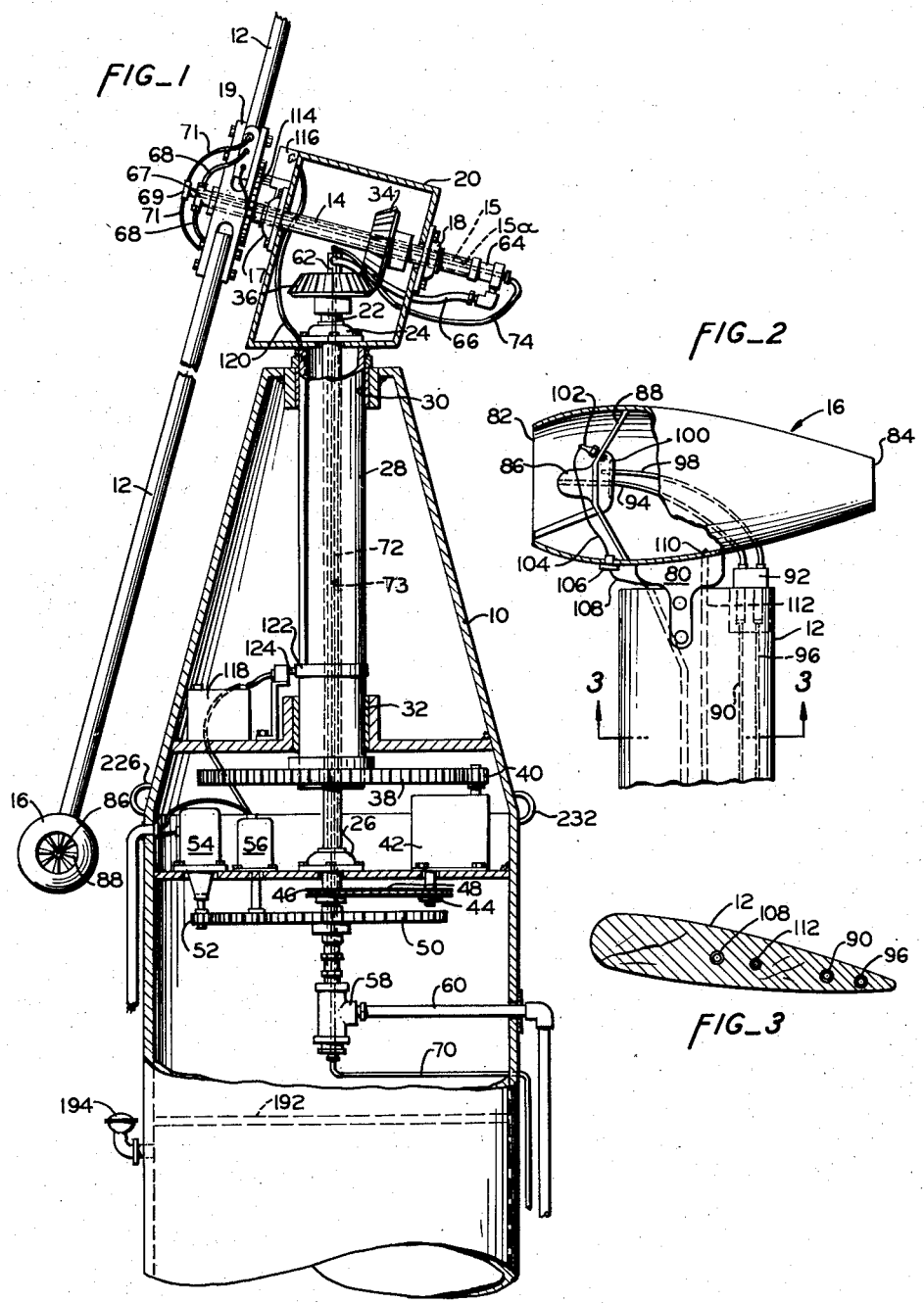
INVENTOR.
JOSEPH E. BECKETT
BY
Ernest L. Brown
ATTORNEY

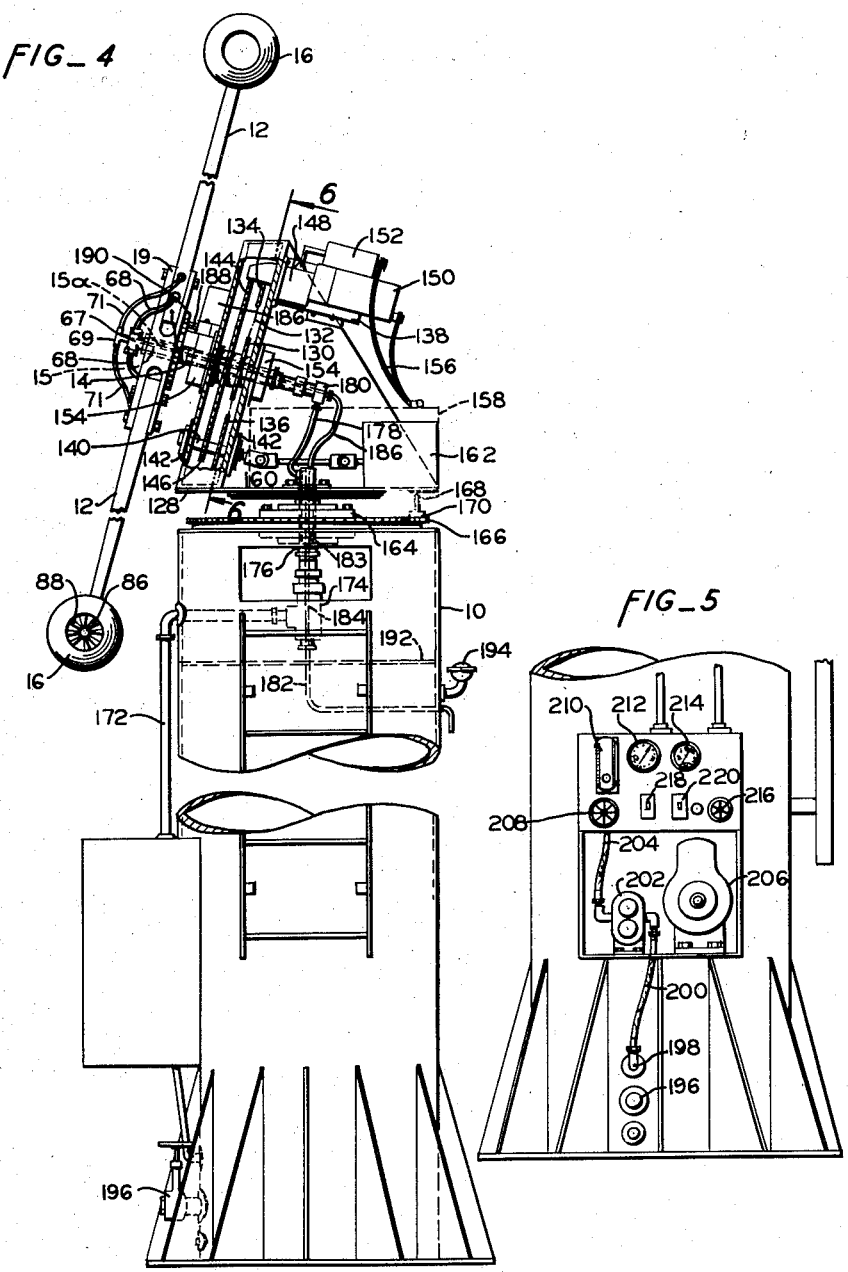

July 21, 1959      J. E. BECKETT      2,895,259
ORCHARD FAN DRIVEN BY RAM-JET ENGINES
Filed July 2, 1956      3 Sheets-Sheet 3
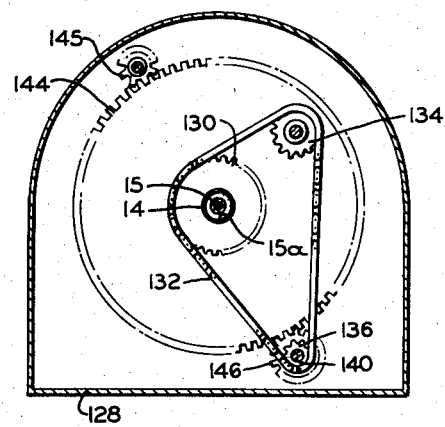
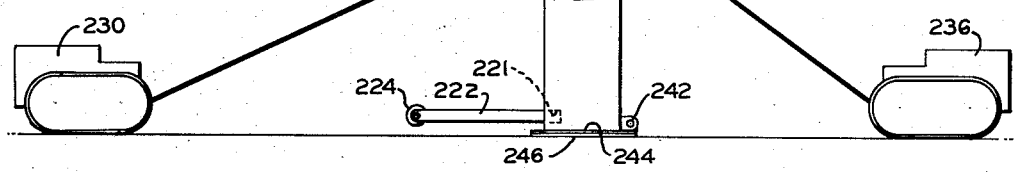
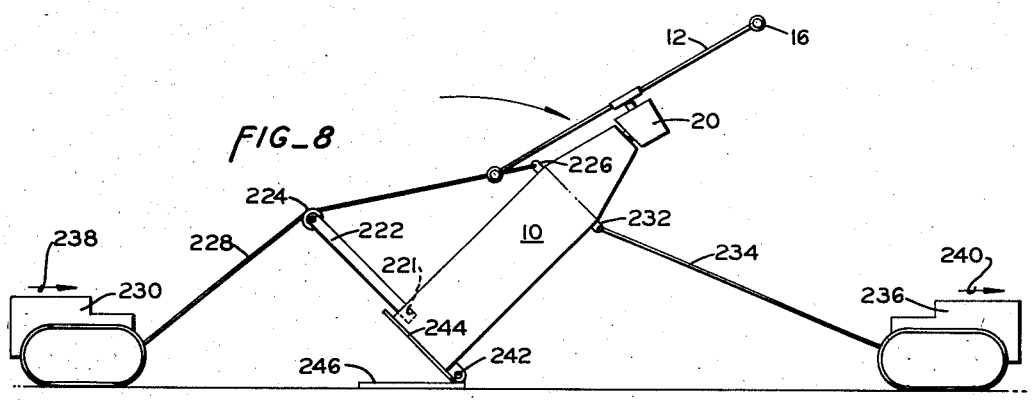
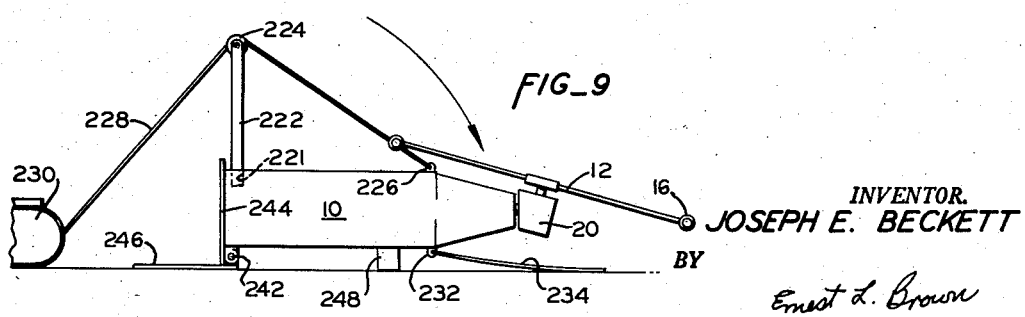
INVENTOR.
JOSEPH E. BECKETT
BY
Ernest L. Brown
ATTORNEY

2,895,259

ORCHARD FAN DRIVEN BY RAM-JET ENGINES

Joseph E. Beckett, Palo Alto, Calif., assignor, by direct and mesne assignments, to Ram Jet Wind Inc., a corporation of California Application July 2, 1956, Serial No. 595,225

13 Claims. (Cl. 47—2)

This invention pertains to a novel orchard fan, and more particularly to a ram-jet driven orchard fan.

When freezing temperatures occur, it is necessary to warm fruit orchards, and the like, to prevent crop damage. Heat must be carried to the fruit trees.

One means for increasing the temperature in an orchard is by using pots of burning oil, called smudge pots, to warm the air around orchard trees. When smudge pots are used, the heat is supplied in concentrated form and a large number of pots must be used to protect the orchard.

Another device utilized to heat orchard trees consists of a pair of hollow pipes, through which combustible gas can be carried, adapted to rotate about a common vertical axis. Gas flowing out of the end of the pipes is ignited to generate heat. The flow of gas outwardly through the hollow pipes caused the pipes to turn about their vertical axis and to distribute hot air over a limited region of an orchard. No fan blades or engines are utilized in this device. The heat is distributed by moving the fires.

It is known that the lowest temperatures in a region occur where the air is static. Immediately above a layer of cold air is a layer of warmer air. Orchard fans have been utilized to fan the warmer upper air into the lower regions to thereby increase the temperature of the air surrounding the growing fruit trees.

Some attempts have been made to combine a conventional hub-driven orchard fan with a heating element, such as a smudge pot, to add additional heat to the air which is distributed by the orchard fan. The heat which is generated to be distributed by the hub-driven orchard fans is not further utilized to drive the fan, as in the device of this invention. That is, the heat is not efficiently utilized and maximum protection is not achieved. Further, when hub-driven fans are utilized, a limit is placed on the length of the fan blades by the amount of torque which can be transferred to the blades by the hub. That is, the hub must be relatively large to carry a large amount of torque to the blades. If the hub is of the size used in the device of this invention, only a small amount of torque can be carried to the blades and the blades are thereby limited in length. Since the blades are limited in length, more fans are needed to protect an orchard.

The device of this invention contemplates an orchard fan utilizing at least two, and perhaps more, fan blades connected to a common hub. Ram-jet engines drive the blade upon the end thereof, hence only a small hub is required for long blades. Because the blades of the fan are driven at their ends, a greater amount of torque can be applied to the fan of this invention than in a conventional orchard fan. Further, ram-jet engines generate an appreciable amount of heat. The heat which is generated in the ram-jet engines is not only utilized to drive the orchard fan, but also to supply heat to the air to be distributed by the orchard fan.

It is further contemplated by this invention to inject water into the ram-jet engine. This may be achieved by utilizing a water nozzle or by utilizing an emulsion of fuel and water in place of the fuel alone. The water laden exhaust from the ram-jet engines is distributed throughout the orchard by the wind from the fan. The highly heated water vapor generated by the ram-jet engines gives off heat when it strikes a cold layer of air. Further, much of the water will deposit upon the orchard trees and leaves to deliver heat directly at the point where it is desired.

It is contemplated that fuel, water and ignition for the ram-jet engines shall be carried through the interior of the blades of the orchard fan to the ram-jet engines. It is further contemplated that the hub of the fan shall be utilized to distribute fuel, water and ignition voltage to the blades. Ignition voltage can be carried from the stationary to the moving parts by means of slip rings and the like. Liquids such as fuel and water can be carried from the stationary to the moving parts by means of swiveled hydraulic connectors.

The ram-jet engines utilized by this invention are relatively low speed ram-jet engines. The engines must be as small and compact as possible, but generate the desired amount of energy to drive the orchard fan.

Aircraft blades are customarily high velocity, low volume blades. That is, aircraft blades drive the surrounding air at a high velocity but actually drive only a relatively small volume of air per unit time. The blades which are preferred upon the device of this invention are high volume, low velocity blades. Ideally, it is desired to generate a low velocity breeze through the orchard but to move the entire air volume of the orchard in order to carry warmed humidified air to each of the orchard trees.

Orchard fans cutomarily utilize stationary towers to support the fan. When service upon the fan is needed, or when the fan must be replaced it is commonly necessary to utilize cranes to reach the fan and replace it. The device contemplated by this invention utilizes a hinged member at the base of the supporting means or tower to allow the supporting means to be tipped over into a horizontal position upon the ground for service.

It is therefore an object of this invention to prevent orchard trees from freezing during cold weather.

It is another object of this invention to provide an improved orchard fan utilizing a new concept of propulsion and of air humidification.

It is a further object of this invention to provide a ram-jet driven orchard fan.

It is still another object of this invention to provide a ram-jet driven, water injected orchard fan.

It is a more particular object of this invention to provide a novel ram-jet driven orchard fan utilizing a clutch-connected starting motor, slip rings for carrying the ignition voltage to the fans, and swiveled hydraulic connectors for carrying fuel and other liquids between the stationary and moving parts.

It is another object of this invention to provide a novel ram-jet driven orchard fan mounted upon a tower with its axis of rotation mounted at a predetermined elevation angle relative to the ground, with its center of gravity positioned to minimize bending movements, and further utilizing energy from the ram-jet engines to rotate the orchard fan in azimuth.

It is also an object of this invention to provide an orchard fan adapted to be moved from an upright to a horizontal position for servicing.

Other objects will become apparent from the following description taken in connection with the accompanying drawings:

Figure 1 is a fragmentary profile view, partially in section, of a preferred embodiment of this invention;

Figure 2 is a view, partially in section, of a typical ram-jet engine utilized to drive the blades of the orchard fan of this invention, and further showing the connections of fuel lines, ignition wires, and water injection lines between the fan blade and the ram-jet engine;

Figure 3 is a sectional view taken at 3—3 in Figure 2 showing a section of a typical fan blade utilized in this invention;

Figure 4 is a broken profile view of a second embodiment of the orchard fan of this invention;

Figure 5 is a view of the base of a typical orchard fan tower utilized in connection with this invention showing typical instrumentation desired for utilization of the orchard fan of this invention;

Figure 6 is a view, partially in section, taken at 6—6 in Figure 4;

Figure 7 is a view of the orchard fan of this invention in a vertical position preparatory to tipping it into a horizontal position for servicing of the fan;

Figure 8 is a view of the orchard fan of this invention partially tipped from the vertical in an intermediate position during the process of placing the fan into a horizontal position for servicing; and Figure 9 shows the orchard fan of this invention tipped into a horizontal position for servicing.

In the figures, support means 10 is adapted to support the orchard fan of this invention at a predetermined height or level and at a predetermined orientation with respect to the ground. Support means 10 is usually a tower adapted to support an orchard fan, positioned within an orchard. Tower 10 is adapted to be tipped from a vertical to a horizontal position to facilitate servicing of the orchard fan. The means and procedure utilized to tip tower 10 will be described in detail hereinafter in connection with the description of Figures 7, 8 and 9.

Fan blades 12, of which there are at least two, are mounted upon hub 19 for rotation about axle or shaft 14. Fan blades 12 are preferably of high strength and light weight material. For example, high strength plastics, with or without a metal leading edge are satisfactory. Fan blades 12 are adapted to carry fuel and water conduits as well as electrical cables along their interior, as will be described hereinafter in connection with the description of Figures 2 and 3.

Ram-jet engines 16 are positioned upon, and are attached to the outer end of blades 12, as shown in Figure 2 and as will be described hereinafter.

A preferred embodiment of this invention is shown in Figure 1. In Figure 1, tower 10 is tapered to cause the center of gravity of the fan and its associated mechanism to be as near as practical to a position directly over the center of the base of tower 10 to minimize bending moments. Blades 12 are connected to a common hub 19 which is mounted for rotation upon shaft 14. Shaft 14 is hollow and has conduits therein for the purpose of carrying fuel and water to blades 12, as will be described more fully hereinafter. Shaft 14 is mounted upon bearings 17 and 18 for rotation relative to housing 20. The axis of rotation of shaft 14 is oriented at a predetermined elevated angle relative to the ground to cause the orchard fan to generate a predetermined air distribution.

Housing 20 is mounted upon hollow shaft 28, which is journaled in bearings 30 and 32, for rotation relative to tower 10.

Hollow shaft 22 is mounted for rotation upon bearing 24 which is attached to housing 22, and upon bearing 26 which is attached to tower 10. Shaft 22 extends through the interior of but does not mechanically engage hollow shaft 28. Shaft 22 is hollow and contains two conduits for the purpose of carrying fuel and water, as will be described more fully hereinafter.

Gear 50 is mounted for rotation upon shaft 22 and is engaged by gear 52 of starting motor 54. Starting motor 54 is usually clutch-connected to gear 52. Alternatively, voltage may be applied to drive starting motor 54 and, after the fan of this invention is started, the electrical circuits to motor 54 are opened whereby starting motor 54 floats as an idling load upon gear 50. It is convenient to drive charging generator 56 from gear 50.

Shafts 14 and 22 are connected together by means of beveled gears 34 and 36 to cause shafts 14 and 22 to rotate together.

Chain 48 engages sprocket 46, which is attached for rotation to shaft 22, and engages sprocket 44. Sprocket 44, therefore, turns in proportion to the rotation of shaft 22. Sprocket 44 and gear 40 are connected by gear train 42, which has a predetermined gear ratio. Gear 40 engages gear 38 which is mounted for rotation upon hollow shaft 28. Because of the described mechanical linkage between sprocket 46 and gear 38, hollow shaft 28 turns in proportion to the rotation of shaft 22, whereby housing 20 is rotated in azimuth about the axis of rotation of shaft 28.

Shafts 14 and 22 are hollow and form a fluid conduit 15a and 73 through which fluid may be carried from one end of the shafts to the other. Conduit 15 in shaft 14 and conduit 72 in shaft 22 are additional fluid conduits which extend through, and are smaller than, conduits 15a and 73, respectively. Conduits 15 and 72 are sealed to prevent fluid leakage between them and conduits 15a and 73, respectively. Conduits 15 and 72 are not necessarily coaxial with shafts 14 and 22. The hollow shaft itself, therefore constitutes a first conduit while a second conduit, sealed from the first conduit, extends through the interior of the first conduit.

Swiveled hydraulic connectors 58 and 62 are connected to opposite ends of shaft 22 and swiveled hydraulic connector 64 is connected to the end of shaft 14. Conduit 60 is connected to a source of fuel or a source of an emulsion of fuel and water. Fuel conduit 60 is connected through swiveled connector 58 to conduit 73 within the interior of shaft 22. Conduit 73 is connected through swiveled connector 62 to flexible conduit 66 which, in turn, is connected through flexible connector 64 to conduit 15a. Conduit 15a is connected through distributing connector 67 and conduits 68 to fuel conduits 90 and 96, shown in Figures 2 and 3 and explained more fully hereinafter.

A source of water is connected to conduit 70. Water conduit 70 is connected through swiveled connector 58 to conduit 72 within the interior of shaft 22. Conduit 72 is connected through swiveled connector 62 to flexible conduit 74 which, in turn, is connected through swiveled connector 64 to conduit 15, thence to distributing connector 69 upon hub 19. Connector 69 is connected through water conduits 71 to conduits 112 within the interior of fan blades 12, as shown in Figures 2 and 3 and described more particularly hereinafter.

Battery 118 is connected through brush 124 and slip ring 122, and cable 120 to spark coil 116. The high voltage output of spark coil 116 is connected through brush and slip ring combination 114 to cable 108, shown in Figures 2 and 3 and described more particularly hereinafter.

The structure shown in Figures 2 and 3 is utilized in both embodiments of this invention, shown in Figures 1 and 4. In Figures 2 and 3, ram-jet engine 16 is attached by means of bracket 80 to fan blade 12. Ram-jet engine 16 is adapted to scoop air at its leading edge 82 and exhaust gases through its exit nozzle at 84. Diffuser 86 is supported upon the axis of symmetry within ram-jet engine 16 by means of a spider-like structure 88. Flame holder 100 is an annular cup which is adapted to receive fuel from conduit 98. Sparking device 102 is positioned relative to flame holder 100 to ignite fuel within flame holder 100 to maintain a flame in ram-jet engine 16.

Fuel conduit 90 is connected by means of fitting 92 to conduit 94 which is positioned to inject fuel into ram-jet engine 16 on the axis of symmetry from the forward end of diffuser 86.

Fuel conduit 96 is connected through fitting 92 to conduit 98 to supply fuel to flame holder 100.

Sparking device 102 is connected through wire 104, insulated bushing 106, and cable 108 to brush and slip ring combination 114.

Nozzle 110 is positioned in the side wall of ram-jet engine 16 to inject water, and is connected by conduit 112 to water conduit 71. Nozzle 110 is preferably positioned to the rear of diffuser 86.

In Figure 4, ram-jet engines 16, fan blade 12 and hub 19, together with their associated mechanisms which carry the same reference numerals as in Figure 1, are identical to that shown and described in connection with Figure 1.

In Figures 4 and 6, hub 19 rotates upon shaft 14 which is mounted upon bearings 154 for rotation relative to platform 128. Sprocket 130 and gear 144 are attached for rotation to shaft 14. Chain 132 engages sprockets 130, 134 and 136, as shown more particularly in Figure 6. Sprocket 134 is shaft-connected to drive battery charging generator 138. Sprocket 136 is connected to shaft 140, which is mounted upon bearings 142 relative to housing 128. Gear 144 engages gear 145 which is connected through clutch 148 to starting motor 150. Gear 144 also engages gear 146 which is upon shaft 140.

Clutch means 148 is controlled by the action of solenoid 152 to connect and disconnect gear 145 from starting motor 150. Voltage for operation of solenoid 152 and starting motor 150 is obtained through cable 156 from battery 158 (shown dotted to avoid confusion).

Platform 128 is mounted upon hollow shaft 176 which is mounted upon bearing 164 for rotation relative to tower 10. Stationary gear 166 which is mounted on tower 10 engages gear 170 which is mechanically linked through gear box 162 and shaft 160 to shaft 140.

Fuel conduit 172 is connected to conduit 183 in the interior of hollow shaft 176, through swiveled hydraulic connector 174. Conduit 183 is connected through flexible conduit 178 and swiveled hydraulic connector 180 to conduit 15a on the interior of shaft 14, thence to distributing connector 67 and conduits 68.

Water conduit 182 is connected through swiveled connector 174 to conduit 184 within the interior of shaft 176. Conduit 184 is connected through flexible conduit 186 and swiveled hydraulic connector 180 to conduit 15, thence to distributing connector 69 and conduits 71.

Tower 10 can conveniently be utilized as a fuel storage tank. The fuel tank is enclosed within the outer walls of tower 10, below separating wall 192. Vent 194 is placed in the top of the fuel tank to allow high pressure vapor to escape. Drain 196 is utilized to drain the fuel tank.

In Figure 5, fuel is removed from the fuel tank through fitting 198 and flexible conduit 200. Motor 206 drives pump 202 which pumps fuel from conduit 200 through conduit 204 and valve 208 into fuel conduit 172 of Figure 4 or conduit 60 of Figure 1.

The control and measuring devices shown in Figure 5 are shown by way of example only and are not essential to this invention. They may be utilized in connection with the orchard fan of Figure 1 as well as the orchard fan of Figure 4.

Flow-meter 210 is utilized to measure the flow of fuel to ram-jet engines 16. Tachometer 212 is electrically connected to shaft 14 (connection not shown) to measure the angular velocity of shaft 14. Pressure guage 214 is utilized to measure the pressure of fuel within the fuel tank. Control valve 216 is utilized to control the flow of fuel to motor 206. Switch 218 is connected to control starter motor 150 and to control solenoid 152. Switch 220 is connected to spark coil 186 to initiate the spark therein.

It is desirable to be able to lay tower 10 into a horizontal position in order to better service the orchard fan of this invention. Figures 7, 8 and 9 show three positions, respectively, in the operation of placing tower 10 into a horizontal position. Partition 244 closes the bottom of tower 10. Foundation 246 is preferably anchored to the ground. Tractors 230 and 236 are connected to tower 10 at 226 and 232 by means of cables 228 and 234, respectively. Tractors 230 and 236 may be replaced by a winch or other equivalent. Tower 10 is adapted to be tipped about hinge 242. During operation of fan 12, tower 10 is locked into its upright position.

Detachable boom 222 is attached at 221 to the bottom of tower 10 in a horizontal position. Pulley 224 is connected to the outer end of boom 222. To tilt tower 10 about hinge 242, tractors 230 and 236 proceed to the right, as shown by arrows 238 and 240. When tractors 230 and 236 have proceeded to the approximate position shown in Figure 8, in the direction shown by arrows 238 and 240, cable 228 contacts and engages pulley 224. Notice that boom 222 remains normal to the principal axis of tower 10. Figure 9 shows the completed operation with tower 10 lying on its side and boom 222 vertical. Caging block 248 is placed under tower 10 to prevent the weight of tower 10 from being supported by fan blade 12.

In operation of the device of Figure 1, fuel is pumped into conduits 60, 73, 66, 15a, 68, 90, 96, 94 and 98. Water is pumped into conduits 70, 72, 74, 15, 71 and 112. Starter motor 54 engages gears 50 which cranks shaft 22, shaft 14 and fan blades 12. Ignition is supplied to ignition device 102 which ignites fuel within flame holder 100. As fan blades 12 pick up speed, fuel which is injected through conduit 94 is blown against the flame in flame holder 100 and ignites. As the speed of fan blades 12 further increases, the fuel within ram-jet engines 16 generates thrust through exit nozzle 84. When the thrust of engines 16 increases, starter motor 54 is disengaged or is allowed to float on gear 50.

As shafts 14 and 22 turn, sprockets 46 and 44 are driven through chain 48, and gear 38 is driven by the rotation of shaft 22 which, in turn, drives shaft 28 and rotates housing 20 in azimuth. The orchard fan is now operating properly.

In operation of the device in Figure 4, fuel is supplied through conduits 172, 183, 178, 15a, 68, 90, 96, 94 and 98. Water is supplied through conduits 182, 184, 186, 15, 71 and 112. To start the device of Figure 4, solenoid 150 engages clutch 148 which connects starter motor 150 to gear 145. Starter motor 150 is then started to drive gear 145, which in turn drives gears 144 and 146. When gear 144 turns, shaft 14 turns and blades 12 start to whirl. As the velocity of blades 12 increases, ram-jet engines 16 start to supply torque to blade 12 and solenoid 115 can be disengaged to disengage clutch 148. Torque is then carried from sprocket 130, by way of chain 132, to sprocket 136. When sprocket 136 or gear 146 turns, shaft 140 turns which drives shaft 160, gear train 162, shaft 168 and gear 170. Because gear 170 engages stationary gear 166, the turning of gear 170 causes platform 128 to rotate in azimuth.

When the control box shown in Figure 5 is used, it is first necessary to start engine 206 which drives pump 202 to pump fuel to ram-jet engines 16. Starter 150 and solenoid 152 are then engaged by the operation of switch 218. Spark is initiated by throwing switch 220. Flow meter 210 measures the flow of fuel to engines 16, tachometer 212 measures the angular velocity of fan blades 12, and pressure guage 214 measures the fuel pressure within the tank of tower 10.

The device of this invention thus provides a novel orchard fan which is adapted to be driven by means of ram-jet engines. The hub of the orchard fan need not be as strong as that of the conventional orchard fan because the running torque is applied at the periphery of the rotating fan and is not carried through the hub. The ram-jet engines of the device of this invention introduce heat and, because of the injection of water into the engines, uniformly spread heated water vapor into the air, which causes the temperature of the orchard trees to be efficiently increased.

Although the device of this invention has been particularly described in two embodiments in connection with the accompanying drawings and the above specification, it is not intended that the invention shall be limited by these embodiments but only in accordance with the scope of the appended claims.

I claim:

1. A ram-jet driven orchard fan comprising: Support means adapted to position said fan at a predetermined height and orientation relative to the ground; a plurality of fan blades attached to a common hub adapted to rotate about a common axle; a plurality of ram-jet engines attached to the end of said blades, respectively; conduit means for carrying fuel to said ram-jet engines; means for carrying ignition voltage to said engines; and mechanical means mechanically linked to be driven by said axle, and adapted to change the orientation of said axle about an azimuth axis.

2. A ram-jet driven orchard fan comprising: support means adapted to position said fan at a predetermined height and orientation relative to the ground; a plurality of fan blades attached to a common hub adapted to rotate about a common axle; a plurality of ram-jet engines attached to the end of said blades, respectively; first conduit means for carrying fuel to said ram-jet engines; means for carrying ignition voltage to said engines; nozzle means adapted to inject water into said ram-jet engines; second conduit means adapted to carry water to said nozzle means; and mechanical means mechanically linked to be driven by said axle, and adapted to change the orientation of said axle about an azimuth axis.

3. A ram-jet driven orchard fan comprising: a tower adapted to support said fan; a platform positioned upon said tower adapted to be rotated in azimuth; an axle, bearing-supported relative to said platform and adapted to carry a fan hub; a fan hub attached to said axle; a plurality of fan blades attached to said hub; a plurality of ram-jet engines attached to the ends of said fan blades, one to each blade respectively; conduit means for carrying fuel from said tower to said platform, thence to said hub and along said fan blades to said ram-jet engines; a voltage source; and means for carrying ignition voltage from said voltage source to said ram-jet engines.

4. A ram-jet driven orchard fan comprising: a tower adapted to support said fan; a platform positioned upon said tower adapted to be rotated in azimuth; an axle, bearing-supported relative to said platform and adapted to carry a fan hub; a fan hub attached to said axle; a plurality of fan blades attached to said hub; a plurality of ram-jet engines attached to the ends of said fan blades, one to each blade respectively; mechanical means linked between said axle and said platform, adapted to rotate said platform in response to the rotation of said axle; conduit means for carrying fuel from said tower to said platform, thence to said hub and along said fan blades to said engines; a voltage source; and means for carrying ignition voltage from said voltage source to said engines.

5. A device as recited in claim 4 in which said conduit means is adapted to carry an emulsion of fuel and water.

6. A ram-jet driven orchard fan comprising: a tower adapted to support said fan; a platform positioned upon said tower adapted to rotate in azimuth; an axle, bearing-supported relative to said platform and adapted to carry a fan hub; a fan hub attached to said axle; a plurality of fan blades attached to said hub; a plurality of ram-jet engines attached to the ends of said fan blades, one to each blade respectively; mechanical means linked between said axle and said platform, adapted to rotate said platform in response to the rotation of said axle; first conduit means for carrying fuel from said tower to said platform, thence to said hub and along said fan blades to said ram-jet engines; a voltage source; means for carrying ignition voltage from said voltage source to said ram-jet engines; nozzle means for injecting water into said engines; and second conduit means for carrying water from said tower to said platform, thence to said hub and along said fan blades to said engines.

7. In combination: a tower, tapered at the top thereof to a predetermined angle, and adapted to position an orchard fan at a predetermined height; a pair of hollow, concentric shafts, journaled in the top of said tower, and adapted to rotate about an azimuth axis; speed reduction gears mechanically connected between said shafts to cause said shafts to rotate at different angular velocities; a platform positioned upon the upper end of the larger of said shafts, adapted to rotate in azimuth with said outer shaft; a third hollow shaft, mounted upon bearings for rotation relative to said platform, and mechanically geared to turn with the inner one of said concentric shafts, said third shaft being oriented angularly in elevation at a predetermined angle relative to the ground; a fan hub positioned upon the outer end of said third shaft; a plurality of fan blades connected to said hub to rotate therewith; a plurality of ram-jet engines connected to the end of said fan blades, respectively; fluid conduit means adapted to carry fuel from said tower to said platform, thence from said platform to said hub, thence along said blades to said engines; a source of ignition voltage; and means for carrying said voltage along said blades to said engines.

8. A device as recited in claim 7 and further comprising: nozzle means associated with said ram-jet engines to introduce water therein; and second conduit means adapted to carry water from said tower to said platform, thence to said hub, thence along said blades to said engines.

9. A device as recited in claim 7 and further comprising: a starter motor connected to drive said fan blades to accelerate said blades to a speed where said engines generate thrust.

10. A ram-jet orchard fan comprising: a tower adapted to carry said fan at a predetermined height; a platform positioned upon the top of said tower, and adapted to be rotated in azimuth; an axle with a hub thereon, rotatably mounted and oriented at a predetermined elevation angle relative to said platform, and adapted to support fan blades; a plurality of ram-jet engines attached to the ends of said blades, respectively; a mechanical linkage between said shaft, said platform, and said support means to cause said platform to rotate in azimuth at a velocity proportional to the rotation of said shaft about its axis; voltage means; means for carrying voltage from said voltage means along said fan blades to said engines; conduit means includling swiveled hydraulic connectors adapted to carry fuel from said tower to said platform, thence to said hub and along said fan blades to said engines.

11. A device as recited in claim 10 and further comprising: means for injecting water into said engines; and second conduit means including swiveled hydraulic connectors, adapted to carry water from said tower to said platform, thence to said hub and along said blades to said engines.

12. A device as recited in claim 10 and further comprising: a detachable boom with a pulley on its outer end adapted to be rigidly attached to the bottom of said tower in a direction normal to the principal axis of said tower, said tower being hinged on the bottom to be tipped about its hinge into a horizontal position for servicing.

13. A ram-jet orchard fan comprising: support means adapted to support said fan at a predetermined height and orientation with respect to the ground; a plurality of fan blades adapted to rotate about a common axle; ram-jet engines positioned upon the end of said blades adapted to drive said blades; a detachable boom with a pulley on its outer end adapted to be rigidly attached to the bottom of said support means in a direction normal to the principal axis of said support means, said support means being hinged on the bottom to be tipped about its hinge into a horizontal position for servicing.

References Cited in the file of this patent

UNITED STATES PATENTS

| | | |
|---|---|---|
| 2,620,882 | Morain | Dec. 9, 1952 |
| 2,653,655 | Salmon | Sept. 29, 1953 |
| 2,672,333 | Rocheville | Mar. 16, 1954 |

FOREIGN PATENTS

| | | |
|---|---|---|
| 14,309 | Australia | of 1923 |

OTHER REFERENCES

Page 15 of "This Week" magazine section, Sunday Star (newspaper), Washington, D. C., April 24, 1949, article "Flying Buzz Saw."